United States Patent
Takahashi et al.

(10) Patent No.: US 8,849,063 B2
(45) Date of Patent: Sep. 30, 2014

(54) APPARATUS AND METHOD FOR OPTIMIZING ON-SCREEN LOCATION OF ADDITIONAL CONTENT OVERLAY ON VIDEO CONTENT

(75) Inventors: Tomohiko Takahashi, Saitama (JP);
Masaru Sugano, Saitama (JP);
Shigeyuki Sakazawa, Saitama (JP)

(73) Assignee: KDDI Corporation, Tokyo (JP)

( * ) Notice: Subject to any disclaimer, the term of this patent is extended or adjusted under 35 U.S.C. 154(b) by 710 days.

(21) Appl. No.: 13/168,447

(22) Filed: Jun. 24, 2011

(65) Prior Publication Data

US 2011/0321084 A1 Dec. 29, 2011

(30) Foreign Application Priority Data

Jun. 25, 2010 (JP) ................................. 2010-144420

(51) Int. Cl.
*G06K 9/46* (2006.01)
*H04N 7/10* (2006.01)
*H04N 5/272* (2006.01)
*G06F 3/00* (2006.01)
*H04N 7/12* (2006.01)
*H04N 5/232* (2006.01)

(52) U.S. Cl.
CPC ................................. *H04N 5/23293* (2013.01)
USPC ........ 382/282; 382/190; 725/32; 348/E5.058; 715/723; 375/240.01

(58) Field of Classification Search
USPC ............ 382/190, 282, 209, 236; 348/E7.071,
348/E5.099, E5.108, E5.058, E5.002,
348/E7.061, E5.105, E7.063; 715/203, 768,
715/716, 723; 375/240.01; 725/32
See application file for complete search history.

(56) References Cited

U.S. PATENT DOCUMENTS

| | | | |
|---|---|---|---|
| 5,146,323 A | 9/1992 | Kobori et al. | |
| 7,688,889 B2* | 3/2010 | Krause | 375/240.01 |
| 8,087,044 B2* | 12/2011 | Krause et al. | 725/35 |
| 8,260,055 B2* | 9/2012 | Wright et al. | 382/190 |
| 8,654,255 B2* | 2/2014 | Hua et al. | 348/584 |
| 2006/0026628 A1* | 2/2006 | Wan et al. | 725/32 |
| 2009/0079871 A1* | 3/2009 | Hua et al. | 348/584 |
| 2011/0314380 A1* | 12/2011 | Pritchett | 715/723 |

FOREIGN PATENT DOCUMENTS

| | | |
|---|---|---|
| JP | 10-233944 A | 9/1998 |
| JP | 2000-182053 A | 6/2000 |
| JP | 2002-101406 A | 4/2002 |
| JP | 2005-252859 A | 9/2005 |

(Continued)

OTHER PUBLICATIONS

Great Britain Search Report of GB1110362.9, issued on Oct. 13, 2011.

(Continued)

*Primary Examiner* — Sheela Chawan
(74) *Attorney, Agent, or Firm* — Westerman, Hattori, Daniels & Adrian, LLP

(57) ABSTRACT

A method of providing a video content formed of a plurality of successive video frames is disclosed. The method includes: extracting a visual feature from an image of each of subject frames which are all or some of the plurality of video frames; and selecting one of a plurality of candidate overlay insertion regions which are pre-assigned on each of the subject frames at different positions for allowing an additional content as a content overlay to be overlaid on the subject frames for display, as a final overlay insertion region, based on distances of the plurality of candidate overlay insertion regions from the extracted feature.

17 Claims, 13 Drawing Sheets

(56) References Cited

FOREIGN PATENT DOCUMENTS

| JP | 2007-215097 A | 8/2007 |
|---|---|---|
| JP | 2007-251273 A | 9/2007 |
| JP | 2009-267474 A | 11/2009 |
| WO | 97/00581 A1 | 1/1997 |
| WO | 03/001815 A1 | 1/2003 |
| WO | 2008/036195 A2 | 3/2008 |
| WO | 2009/144464 A1 | 12/2009 |
| WO | 2010/059193 A1 | 5/2010 |

OTHER PUBLICATIONS

Japanese Office Action dated Nov. 20, 2013, issued in corresponding Japanese Patent Application No. 2010-144420 with partial translation (5 pages).
"Yahoo! Connected TV", visited online on May 31, 2010, <URL:http://connectedtv.yahoo.com/services/tv-widgets>.
"Google Ad Sense", visited online on May 31, 2010, <URL:https://www.google.com/adsense/static/ja/AdFormats.html>.
Ma et al., "A User Attention Model for Video Summarization", ACM Multimedia, 2002, 10 pgs.
Concise Explanation of Non-Patent Documents.

\* cited by examiner

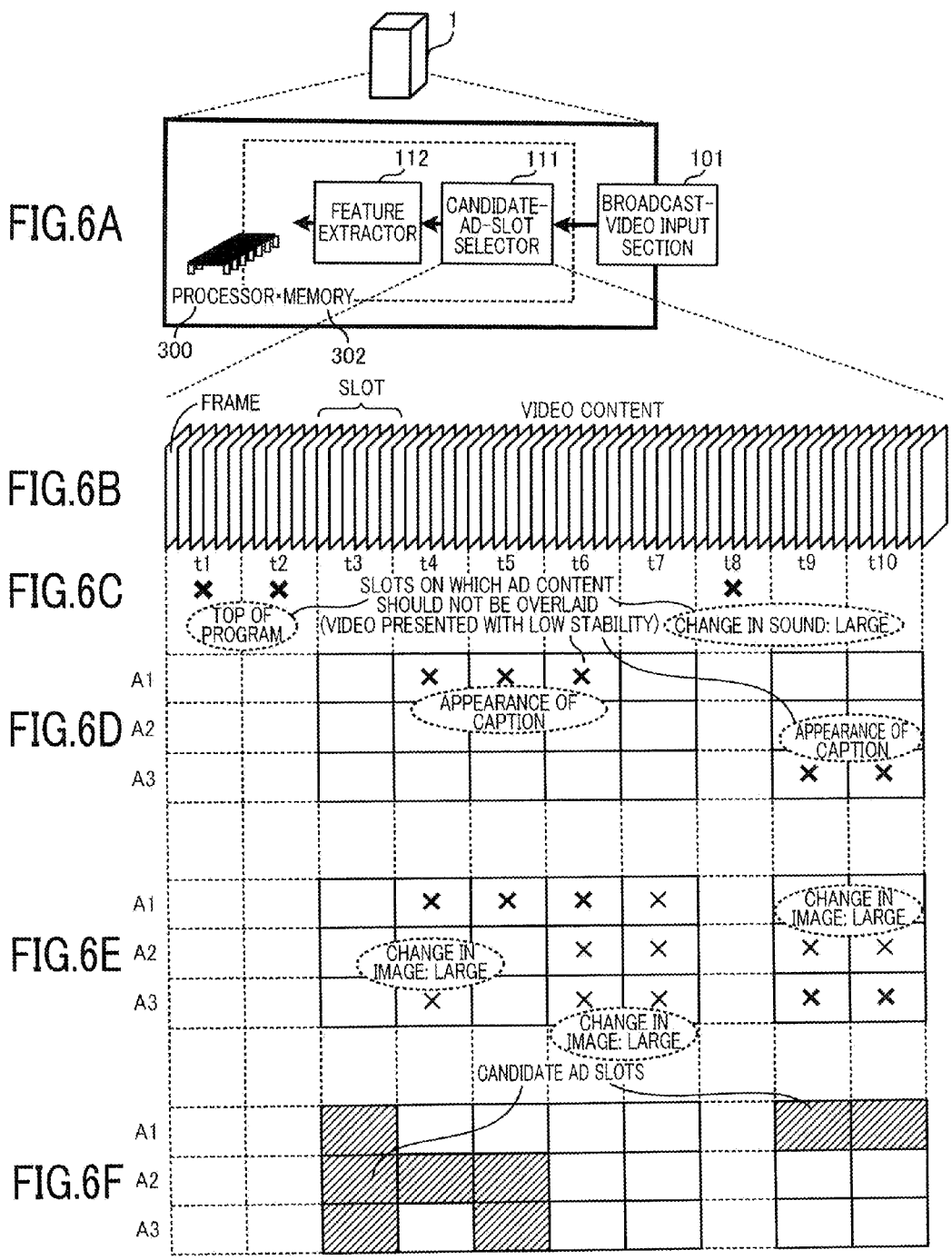

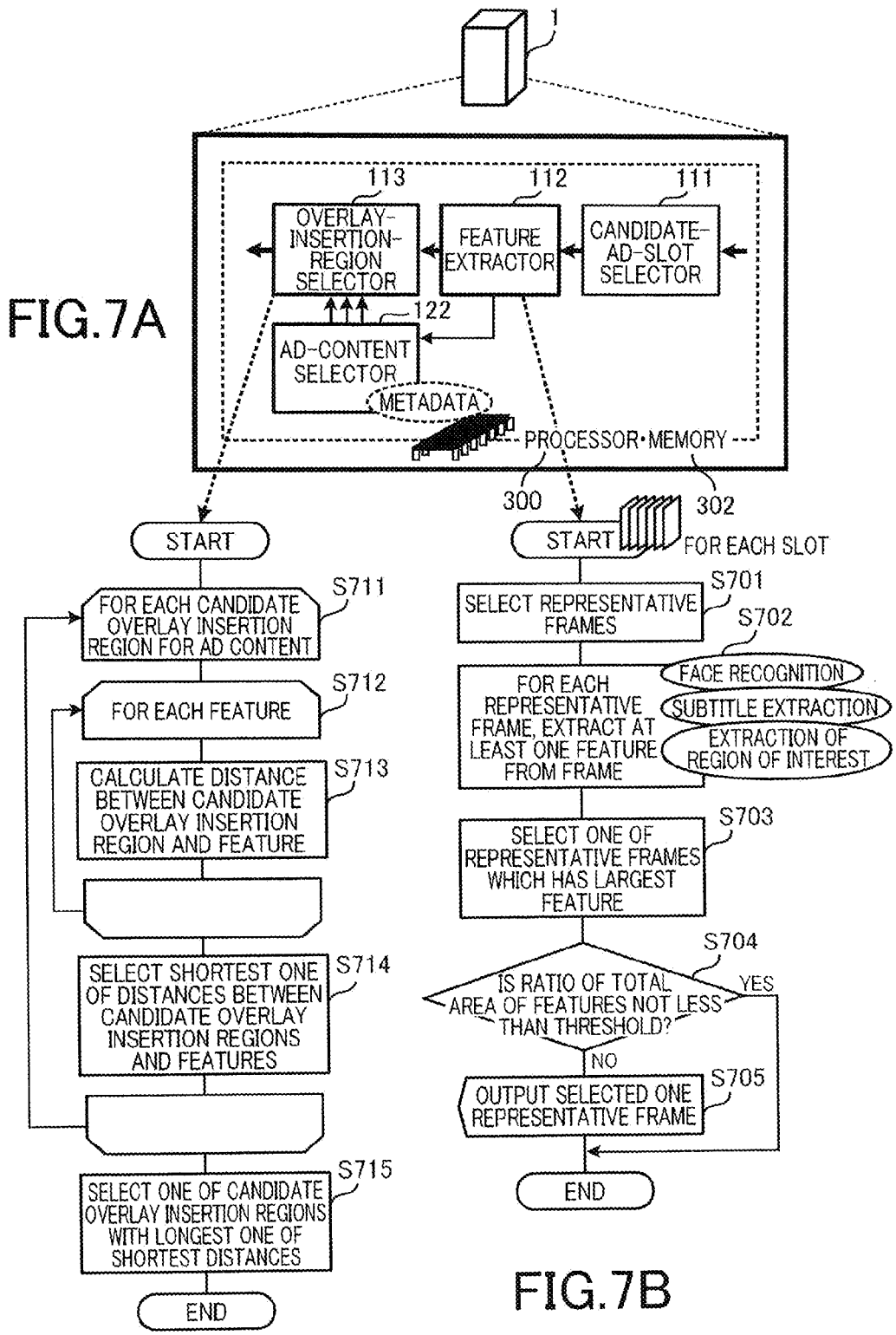

EXAMPLE OF METADATA (POLICY)

| Column Name | Value | Example | Description |
|---|---|---|---|
| Policy_id | Int | 65535 | ID of unique policy |
| Advertiser_ID | Int | 1234 | ID for uniquely identifying advertiser |
| Start_date | date | Feb/08/2010 | start date of ad delivery |
| End_date | date | May/08/2010 | end date of ad delivery |
| IsGlobal | bool | False | Is target coverage of ad global? national level: true, local level: false |
| TargetChannel | Int | 4,6,8,10, 12,61 | Nos. of intended target TV channels for ad delivery |
| TargetArea | Postal Code | 356-xxxx, 102-xxxx | Nos. for target areas for ad delivery |
| Day | Date | Mon. - Fri. | intended delivery date for ad |
| Time | Time | 7:00 - 11:00 | Intended delivery time for ad |
| TargetUser Attribute | User Attribute | (kidsPresent= True)& (age > 20) | attributes of intended target users for ad delivery. In this example, the intended target is a family in which there are one or more children and a TV subscriber is aged over twenty. |
| Target Entertainment Attribute | Entertainment Attribute | (Genre!= violence)& (Rating = G|PG) | attributes of programs into which ad is intended to be inserted. In this example, the target programs are categorized as no violence, and the selected rating indicates that authorized viewers are all ages. |
| MaxViewTotal | Int | 1000 | maximum number of views for all users |
| MaxViewPerUser | Int | 5 | maximum number of views per one user |
| Thumbnail Filename | Char | | thumbnail of filenames |

FIG. 12

EXAMPLE OF USER-RELATED INFORMATION

| Column name | Value | Example | Description |
|---|---|---|---|
| subscriber_id | Int | 65535 | ID for uniquely specifying subscriber(subscriber's household |
| PricePlan | Int | 1 | type of price schedule bound by subscriber's contract made with service provider |
| Age | Int | 20 | Age of subscriber which is obtained through voluntary questions to customers |
| Gender | Male or female | Male | Gender of subscriber which is obtained through voluntary questions to customers |
| ZIP | ZIP code | 356-8502 | Zip code of subscriber's house which is utilized for identifying geographical area in which subscriber resides |
| Household TotalRevenue | Int | 500- | Total revenue of subscriber's household which is obtained through voluntary questions to customers. This example indicates that the total revenue is over ¥5 million. |
| KidsPresent | Bool | True | Is there any child? The answer is obtained through voluntary questions to customers. |

FIG. 13

APPARATUS AND METHOD FOR OPTIMIZING ON-SCREEN LOCATION OF ADDITIONAL CONTENT OVERLAY ON VIDEO CONTENT

CROSS-REFERENCE TO RELATED APPLICATIONS

This application claims the priority benefit of Japanese Patent Application No. 2010-144420, filed Jun. 25, 2010, the content of which application is incorporated herein by reference in its entirety.

BACKGROUND OF THE INVENTION

1. Field of the Invention

The invention relates generally to techniques of displaying a video content on screen with an additional content overlay such as an advertising content (or "ad content") overlay on the video content.

2. Description of the Related Art

As a result of recent developments, a digital video content such as a broadcast television program can be delivered to viewers with various techniques which cover not only terrestrial digital broadcasting, but also streaming media techniques and Video-On-Demand (VOD) casting techniques via the Internet and cables.

More specifically, techniques of distributing a video content to viewers generally include broadcasting and webcasting. In this regard, the term "video content" can be used in a narrow sense to exclude an audio content, but can be also used in a broad sense to also include an audio content associated with the video content. The term "broadcasting" can be used in a narrow sense to only refer to distribution of a video content via radio wave or cable to an unspecified large number of viewers, but can be also used in a broad sense to refer to webcasting in which a video content is distributed to viewers in the form of a media stream, via wireless or wired IP (Internet Protocol) network. Hereinafter, throughout the specification, for ease of description, the term "broadcasting" may be used to cover all possible types of distributing a video content to viewers.

In many situations, traditionally, an ad content (e.g., a commercial message (CM)) is inserted into a video content (i.e., a video signal) at the beginning of the video content (i.e., before the feature content within the video content begins), or is inserted into breaks or gaps between divided segments of the video content, for example.

Survey results demonstrate that, in these situations, a considerable number of viewers tend to interrupt the viewing of such a video content at the mere sight of the ad content at the beginning of the video content, or tend to skip the ad content within the video content while the video content is played back by a digital video recorder which has recorded the video content that was broadcast.

For this reason, there is a need to present an additional content such as an ad content to viewers in a more effective manner, depending on a selected format of a video content to be delivered.

There is a known technique of displaying a video content along with an ad content overlay (or "ad overlay") on the video content (see, for example, Non-Patent Document No. 1 listed below). In an example, such an ad overlay is composed using a displayable overlay application such as "TV Widget." This technique, however, is directed only to presentation to viewers of information which is independent of and irrelevant to both the context of a video content displayed together with the ad overlay on a display screen (e.g., a television screen or video screen), and image characteristics (e.g., color tone) with which the video content is displayed on the display screen.

Aside from the relevancy to video distribution technique, there is another known technique of presenting an ad content to a viewer, in response to the viewer's click on a selected object within a video content displayed on a display screen, along with the ad content relevant to the context of the selected object (see, for example, Patent Document No. 1 listed below).

There is still another known technique of presenting an ad content to a viewer who is viewing a video content, in a timely manner for the viewer's effective viewing (see, for example, Patent Document No. 2 listed below).

There is yet still another known technique, as webcasting (i.e., distributing a video content via the Internet), for presenting to a viewer an ad content relevant to the context of a webpage that the viewer is viewing.

There is an additional known technique of inserting an ad content into a webpage displayed on a display screen at a pre-designated location (see, for example, Non-Patent Document No. 1 listed below). This technique allows a server to accept online requests from many advertisers for insertion of ad contents, each of which is composed in a given format.

On the other hand, a website operator provides advance knowledge to potential advertisers through a website managed and published by the website operator, in order to make the advertisers to learn that there are some candidate regions into which each advertiser can insert a desired ad content.

Thereafter, each time a user views the website that the user needs, the server selects an ad content having a best match with the user, based on the user's profile, and presents the selected or tailored ad content to the user, on the website in one of the candidate regions which has previously been selected by a particular advertiser on the website.

In one example, a user's profile is information on such as the geographical address of a user's home, which can be obtained from a user's unique IP (Internet Protocol) address. This technique, which is for selection of a relevant ad content based on a user's profile and presentation of it to the user, is referred to as "targeted advertising."

LIST OF PATENT DOCUMENTS AND NON-PATENT DOCUMENTS

Patent Documents

No. 1: 2009-267474
No. 2: 2002-101406
No. 3: 2000-182053
No. 4: Ser. No. 10/233,994
No. 5: 2005-252859

Non-Patent Documents

No. 1: "Yahoo! CONNECTED TV," visited online on May 31, 2010, <URL: http://connectedtv.yahoo.com/services/tv-widgets>
No. 2: "Google Ad Sense," visited online on May 31, 2010, <URL: https://www.google.com/adsense/static/ja/AdFormats.html>
No. 3: "A User Attention Model for Video Summarization," co-authored by Yu-Fei Ma, Lie Lu, Hong-Jiang Zhang, and Mingjing Li, ACM Multimedia, December 2002

It is noted that the contents of Patent Document Nos. 1-5 and Non-Patent Document Nos. 1-3 are incorporated herein by reference in their entirety.

BRIEF SUMMARY OF THE INVENTION

None of the above-described documents discloses that, when a video content is displayed on screen with an ad content overlay to a user, the ad content overlay is displayed on screen at a location and a time both of which have been selected for promoting the user's effective simultaneous viewing of the video content and the ad content overlay.

More specifically, non-patent document No. 1 fails to disclose a technique of locating and displaying an ad content overlay on screen, based on the image composition or the image characteristics of a video content displayed together with the ad content overlay.

Patent document No. 1 fails to disclose a technique of optimizing the location and the time to display an ad content overlay on screen.

Patent document No. 2 discloses a technique of displaying an ad content overlay to a user at a time set for enhancing the effectiveness of the user's viewing. This technique, however, the time to display the ad content overlay is selected based on time-related information previously provided, without dependence on the story development of a video content displayed together with the ad content overlay.

Non-patent document No. 1, as described above, discloses a mere technique of allowing an advertiser to select an ad content overlay, by considering the relationship between the context of the ad content overlay and the context of a webpage displayed together on screen. In this technique, the location to display the ad content overlay on screen is previously selected, without considering the image composition or the image characteristics of the webpage displayed together with the ad content overlay.

As will be understood from the foregoing, none of the above-described documents discloses a technique of overlaying an ad content onto a video content on screen, based on the image composition or the image characteristics of the video content displayed together. As a result, the techniques disclosed in the above-described documents have drawbacks that, when a user views the video content and the ad content overlay together, the user will be highly likely to feel visual discomfort from the screen, due to unmatching on-screen location to display the ad content overlay and unmatching image characteristics (e.g., color tone) of the ad content overlay.

It is noted that there are differences between the webcasting and the television broadcasting, as follows:

(1) When the webcasting is performed, it is possible to designate the on-screen location at which an additional content overlay will be inserted into a video content when displayed on screen, prior to the transmission of the video content, to thereby make it easier to optimally compose and design an entire image which will be eventually displayed on a display screen of a user's terminal, before transmission.

In contrast, when the television broadcasting is performed, it is impossible to designate the on-screen location at which an additional content overlay will be inserted into a video content when displayed on screen, prior to the broadcasting of the video content.

(2) When the webcasting is performed, a video content is displayed on screen in the form of a collection of relatively static successive pages (with smaller page-to-page visual changes) composed in HTML (HyperText Markup Language), making it easier to determine the on-screen location at which an additional content overlay is inserted into the video content.

In contrast, when the television broadcasting is performed, a video content is displayed on screen in the form of a dynamic video in which pictures are moving over time (with larger frame-to-frame visual changes), making it more difficult to determine the on-screen location at which an additional content overlay is inserted into the video content.

In view of the foregoing, it would be desirable to select the on-screen location at which an additional content overlay should be inserted into a video content, and/or the image characteristics with which the additional content overlay should be displayed with the video content, in order to prevent a user from feeling visual discomfort from the entire screen image to a maximum extent.

According to a first aspect of the invention, an apparatus for providing a video content formed of a plurality of successive video frames is provided, which comprises:

a feature extractor configured to extract a visual feature from an image of each of subject frames which are all or some of the plurality of video frames; and an overlay insertion region selector configured to select one of a plurality of candidate overlay insertion regions which are pre-assigned on each of the subject frames at different positions for allowing an additional content as a content overlay to be overlaid on each subject frame for display, as a final overlay insertion region, such that, on each subject frame, the final overlay insertion region has a distance from the extracted feature that is substantially the longest among distances of the plurality of candidate overlay insertion regions from the extracted feature.

According to a second aspect of the invention, a method of providing a video content formed of a plurality of successive video frames is provided, which comprises:

extracting a visual feature from an image of each of subject frames which are all or some of the plurality of video frames; and selecting one of a plurality of candidate overlay insertion regions which are pre-assigned on each of the subject frames at different positions for allowing an additional content as a content overlay to be overlaid on each subject frame for display, as a final overlay insertion region, such that, on each subject frame, the final overlay insertion region has a distance from the extracted feature that is substantially the longest among distances of the plurality of candidate overlay insertion regions from the extracted feature.

According to a third aspect of the invention, a method of providing a video content formed of a plurality of successive video frames is provided, which comprises:

extracting a visual feature from an image of each of subject frames which are all or some of the plurality of video frames; and selecting one of a plurality of candidate overlay insertion regions which are pre-assigned on each of the subject frames at different positions for allowing an additional content as a content overlay to be overlaid on the subject frames for display, as a final overlay insertion region, based on distances of the plurality of candidate overlay insertion regions from the extracted feature.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 6A is a functional block diagram illustrating a candidate-ad-slot selector depicted in FIG. 5, along with its peripheral elements, and FIGS. 6B-6F are views for explaining processing by the candidate-ad-slot selector, using an exemplary video content;

FIG. 7A is a functional block diagram illustrating a feature extractor and an overlay-insertion-region selector depicted in FIG. 5, with their peripheral elements, FIG. 7B is a flowchart conceptually illustrating processing by the feature extractor, and FIG. 7C is a flowchart conceptually illustrating processing by the overlay-insertion-region selector;

FIG. 12 is a table illustrating an exemplary set of policies in metadata associated with an ad content; and FIG. 13 is a table illustrating an exemplary set of user-related information.

DETAILED DESCRIPTION OF THE INVENTION

Figure 1:
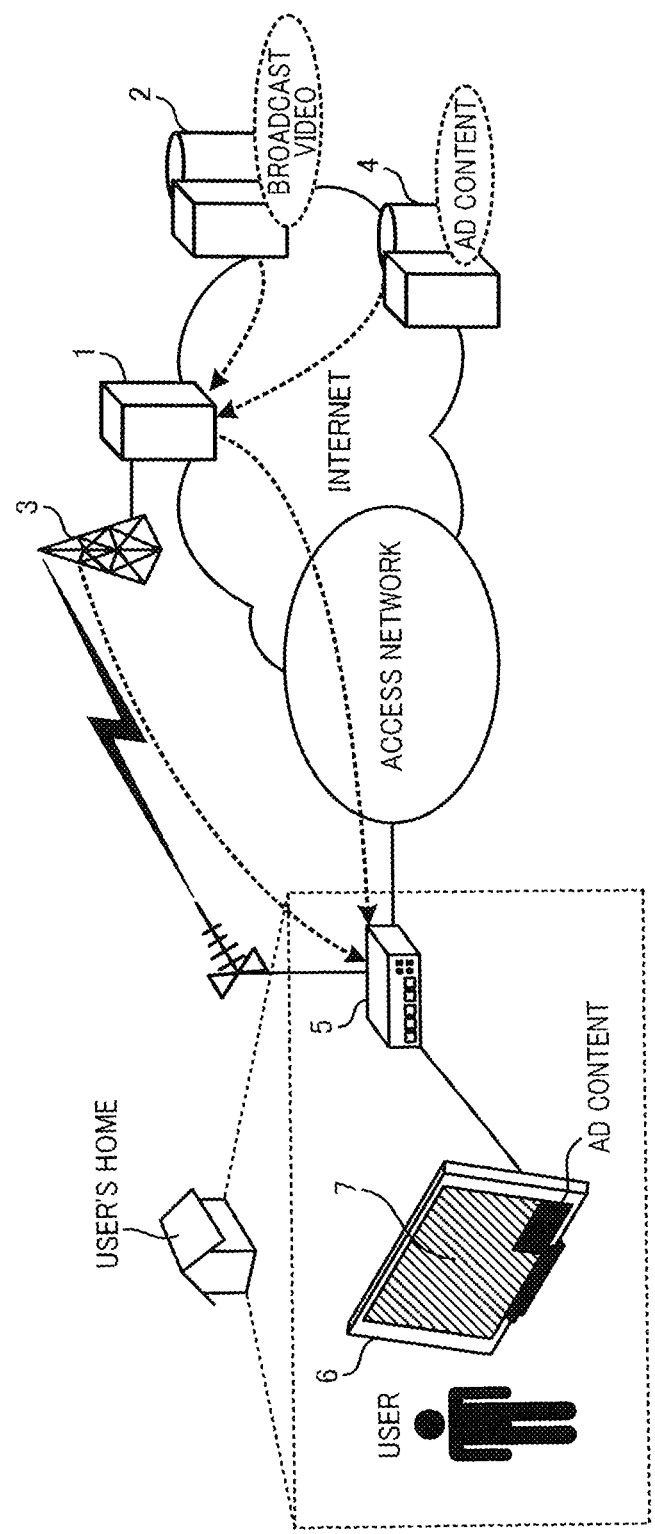
FIG. 1 is a schematic diagram illustrating a broadcasting system constructed according to a first illustrative embodiment of the present invention, wherein a video providing unit linked to a broadcast center overlays an ad content onto a video content.

According to the invention, the following modes are provided as illustrative embodiments of the invention.

According to a first mode of the invention, there is provided the apparatus according to the first aspect of the invention, wherein the overlay insertion region selector is configured to calculate, for each subject frame, a distance of the extracted feature from each candidate overlay insertion region, weighted using a weighting factor $\omega$ which is equal to or larger than "0" and equal to or smaller than "1," to thereby allow a pre-designated one of the plurality of candidate overlay insertion regions to be more likely to be selected as the final overlay insertion region than any other candidate overlay insertion region.

According to a second mode of the invention, there is provided the apparatus according to the first aspect or the first mode, wherein the distance is defined as a distance between a centroid of each candidate overlay insertion region and a centroid of the extracted feature, or a distance between a circumferential edge of each candidate overlay insertion region and the centroid of the extracted feature.

According to a third mode of the invention, there is provided the apparatus according to any one of the first aspect and the first and second modes, wherein the feature includes a plurality of features of each subject frame, the overlay insertion region selector is configured to calculate, for each candidate overlay insertion region, a plurality of distances of the plurality of features from the each candidate overlay insertion region, respectively, to select, for each candidate overlay insertion region, one of the plurality of features which has the shortest one of the plurality of distances calculated, as a nearest feature, and to select one of the plurality of candidate overlay insertion regions which has the longest one of a plurality of distances from the nearest feature, as the final overlay insertion region.

According to a fourth mode of the invention, there is provided the apparatus according to any one of the first aspect and the first through third modes, wherein the additional content includes a plurality of additional contents to be overlaid on the video content, and the overlay insertion region selector configured to select one of the plurality of candidate overlay insertion regions in decreasing order of the distance from the extracted feature, in succession, such that a successively-selected one of the plurality candidate overlay insertion regions serves as the final overlay insertion region for a successively-selected one of the plurality of additional contents.

According to a fifth mode of the invention, there is provided the apparatus according to any one of the first aspect and the first through fourth modes, wherein the additional content includes a plurality of additional contents to be overlaid on the video content, the apparatus further comprises an additional content selector configured to select, at least one valid additional content, at least one of the plurality of additional contents, such that a degree of similarity in visual characteristic between an image of the video content and an image of the selected at least one valid additional content satisfies a pre-determined condition, and the overlay insertion region selector is configured to select one of the plurality of candidate overlay insertion regions as the final overlay insertion region for the selected at least one valid additional content.

According to a sixth mode of the invention, there is provided the apparatus according to the fifth mode, wherein the visual characteristic is defined as color tone of an image.

According to a seventh mode of the invention, there is provided the apparatus according to the fifth or sixth mode, wherein the predetermined condition is defined so as to be satisfied if the degree of similarity is higher than a predetermined similarity level, is defined so as to be satisfied if the degree of similarity is lower than a predetermined similarity level, or is defined so as to be satisfied if the degree of similarity falls within a predetermined range.

According to an eighth mode of the invention, there is provided the apparatus according to any one of the first aspect and the first through seventh modes, wherein the plurality of video frames are segmented into a plurality of successive slots each in a temporal array of a sub-plurality of successive video frames, the apparatus further comprises a candidate overlay insertion slot selector configured to select at least one of the plurality of successive slots as at least one candidate overlay insertion slot each of which is a candidate of a slot into which the additional content is finally inserted, and the candidate overlay insertion slot selector is configured to exclude at least one of the plurality of successive slots, if the at least one slot is not suitable for use in overlay of the additional content on the video content, to measure a visual and/or audio characteristic value of each slot, to select at least one of the remaining slots as the at least one candidate overlay insertion slot, if the at least one slot has the visual and/or audio characteristic value measured so as to be equal to or lower than a predetermined threshold, and to output the selected at least one candidate overlay insertion slot to the feature extractor.

According to a ninth mode of the invention, there is provided the apparatus according to the eighth mode, wherein the feature extractor is configured to select, for each candidate overlay insertion slot, a plurality of provisional representative frames from the sub-plurality of successive video frames forming each candidate overlay insertion slot, to extract a feature from an image of each provisional representative frame, to select, for each candidate overlay insertion slot, one of the plurality of provisional representative frames which has a total area of the extracted feature that is the largest among total areas of features of the plurality of provisional representative frames, as a final representative frame, wherein, for each provisional representative frame, if the extracted feature includes only one feature, the total area is equal to an area of the only one feature, while if the extracted feature includes a plurality of features, the total area is equal to a sum of areas of the plurality of features, and to exclude at least one of the plurality of candidate overlay insertion slots, which corresponds to the final representative frame that has a ratio of the total area of the extracted feature, to an area for display of the final representative frame.

According to a tenth mode of the invention, there is provided the apparatus according to any one of the first aspect and the first through ninth modes, wherein the feature extractor is configured to extract the feature from each subject frame, by at least one of the followings:

facial recognition,
caption extraction,
motion recognition using a motion attention model,
extraction of Region of Interest (ROI),
extraction of interest points,
feature extraction based on a total energy level of alternate-current high-frequency components of Discrete Cosine Transform (DCT) coefficients, and
feature extraction based on luminance/saturation.

According to an eleventh mode of the invention, there is provided the apparatus according to any one of the first aspect and the first through tenth modes, wherein the video content includes digital broadcast video data to be delivered from a broadcast center to a plurality of potential or actual viewers, the additional content includes an advertising content as an advertisement overlay to be delivered from an advertisement distribution server to the plurality of viewers, and the apparatus further comprises an advertising content storage device, locally disposed for each viewer, and configured to store therein the advertising content received from the advertisement distribution server.

According to a twelfth mode of the invention, there is provided the apparatus according to any one of the first aspect and the first through eleventh modes, wherein the advertising content storage device stores therein a plurality of advertising contents, in association with a plurality of sets of information corresponding to the plurality of viewers, and the apparatus further comprises an advertising content selector, locally disposed for each viewer, and configured to select at least one of the plurality of advertising contents stored in the advertising content storage device, based on the information corresponding to each viewer who has received the video content.

According to a thirteenth mode of the invention, there is provided the apparatus according to any one of the first aspect and the first through twelfth modes, further comprising:

an additional content overlay insertion section configured to insert the additional content into the video content, so that the video content is displayed such that the additional content is overlaid on the selected final overlay insertion region, to thereby modify the video content, and a video content output section configured to output the modified video content.

Several presently preferred embodiments of the invention will be described in more detail by reference to the drawings in which like numerals are used to indicate like elements throughout.

Referring now to FIG. 1, a broadcasting system constructed according to a first illustrative embodiment of the present invention is illustrated in a schematic diagram. In the broadcasting system, a video providing unit 1 is linked to a broadcast center 2, and the video providing unit 1 is configured to overlay an advertising content (or "ad content") onto a video content. The term "video" as used herein is intended include texts, graphics, still or moving images, etc. Throughout the specification, the term "ad overlay" is used to refer to an ad content overlay or an ad overlay content.

Figure 2:
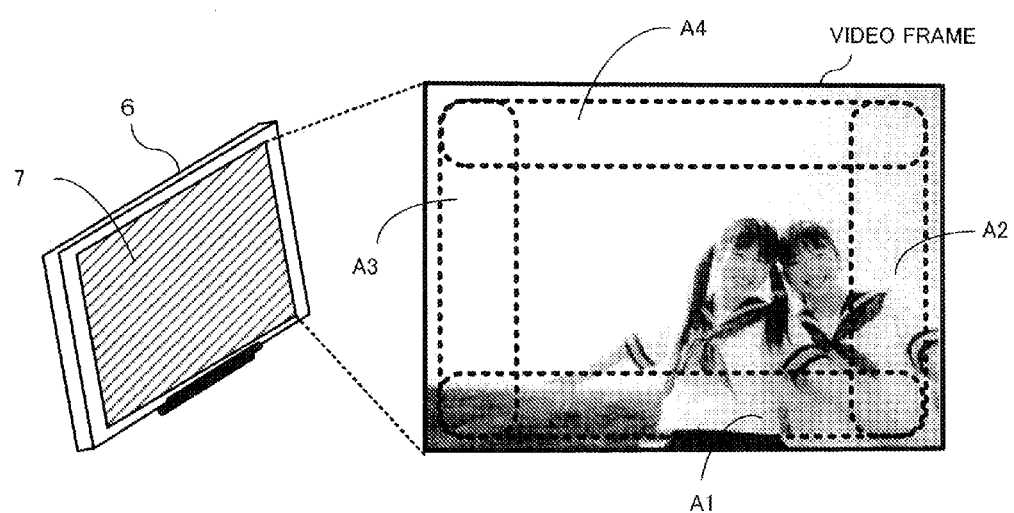
FIG. 2 is a view illustrating an exemplary video frame displayed on a display screen of a user's terminal in the broadcasting system depicted in FIG. 1, together with a plurality of exemplary candidate overlay insertion regions assigned on the video frame.

As illustrated in FIG. 2, the video providing unit 1, which is connected with the broadcast center 2 and a broadcasting antenna 3, is configured to input from the broadcast center 2 a broadcast video (i.e., a video content) which will be delivered. The broadcast video, which is made up of a plurality of successive video frames, is segmented into a plurality of successive slots (e.g., candidate advertisement slots (or "ad slots") or candidates of a final ad slot) each in a temporal array of a sub-plurality of successive video frames. The video segmentation may be performed by length-based segmentation, so that each slot has a fixed length, may be performed by scene segmentation (or context-based or semantic-based video segmentation), using metadata (i.e., data about data contents) which is produced in the broadcast center 2 and which is included with or appended to the video content, or may be performed by visual-feature-based segmentation (see Patent Document No. 5, for example).

The video providing unit 1 is configured to overlay an additional content onto a video content (i.e., a broadcast video). One example of such an additional content is an ad content. Such an ad content may be any content to promote an article or service, or provide public notice of some subject matter (e.g., governmental, municipal or political announcement or advertising, etc.).

In a preferable example, ad widget may be overlaid over a broadcast video. An ad content contemplated herein may be a content which has previously been stored in the video providing unit 1, or may be provided from an ad distribution server 4 over the Internet when requested.

An additional content contemplated herein is not limited to an ad content, and may alternatively be, for example, a content relevant to a broadcast video which is displayed together, or a content irrelevant to such a broadcast video.

In one example, the broadcast video (i.e., a video content) is represented by digital broadcast video data which is broadcast from the broadcast center 2 (e.g., a terrestrial digital broadcast center). In this example, the video providing unit 1 is configured to send a video content combined with an advertising overlay (or "ad overlay") to the broadcasting antenna 3, to thereby transmit the video content combined with the ad overlay towards terminals 6 (e.g., television sets) used by users (i.e., an unspecified large number of viewers) from the broadcasting antenna 3, via a radio wave (i.e., a broadcasting wave), for the users' viewing.

Each terminal 6 includes a display screen or video screen 7 on which the received video content is played back for presentation to the user, and an audio presentation device (not shown) for playing back an associated audio or sound received along with the video content.

In an alternative example, the video providing unit 1 is configured to distribute a video content combined with an ad overlay, over the Internet or an access network (including a CATV), towards the terminals 6 in a webcasting format. In one implementation in which the webcasting is in a VOD (Video On Demand) format, a video content combined with an ad overlay is distributed to the terminal(s) 6 of the user(s), over the Internet or a CATV.

As illustrated in FIG. 1, in a user's home, there is a set-top box 5 linked to the terminal 6. The set-top box 5 is configured to receive a broadcasting wave from the broadcast center 2 or receive a video broadcast signal over the Internet. In either case, the set-top box 5 sends the received broadcast video to the terminal 6 for the user's viewing.

FIG. 2 is a view illustrating an exemplary video frame displayed on the display screen 7 of a user's terminal 6 in the broadcasting system depicted in FIG. 1, together with a plurality of exemplary candidate overlay insertion regions assigned on the video frame.

In the present embodiment, a plurality of candidate overlay insertion regions (e.g., templates) are assigned onto each video frame or the display screen 7, which regions allow an ad content to be overlaid on a video content on the display screen 7. Each video frame can be assigned only one overlay insertion region. In an example illustrated in FIG. 2, each video frame is assigned four candidate overlay insertion regions A1-A4. The candidate overlay insertion regions A1-A4 are preferably located on the display screen 7, in peripheral edges, corner sections, or marginal sections, such that the candidate overlay insertion regions A1-A4 will not occlude at all or will occlude as little as possible a principal content (or a principal object) of each video frame.

Figure 3:
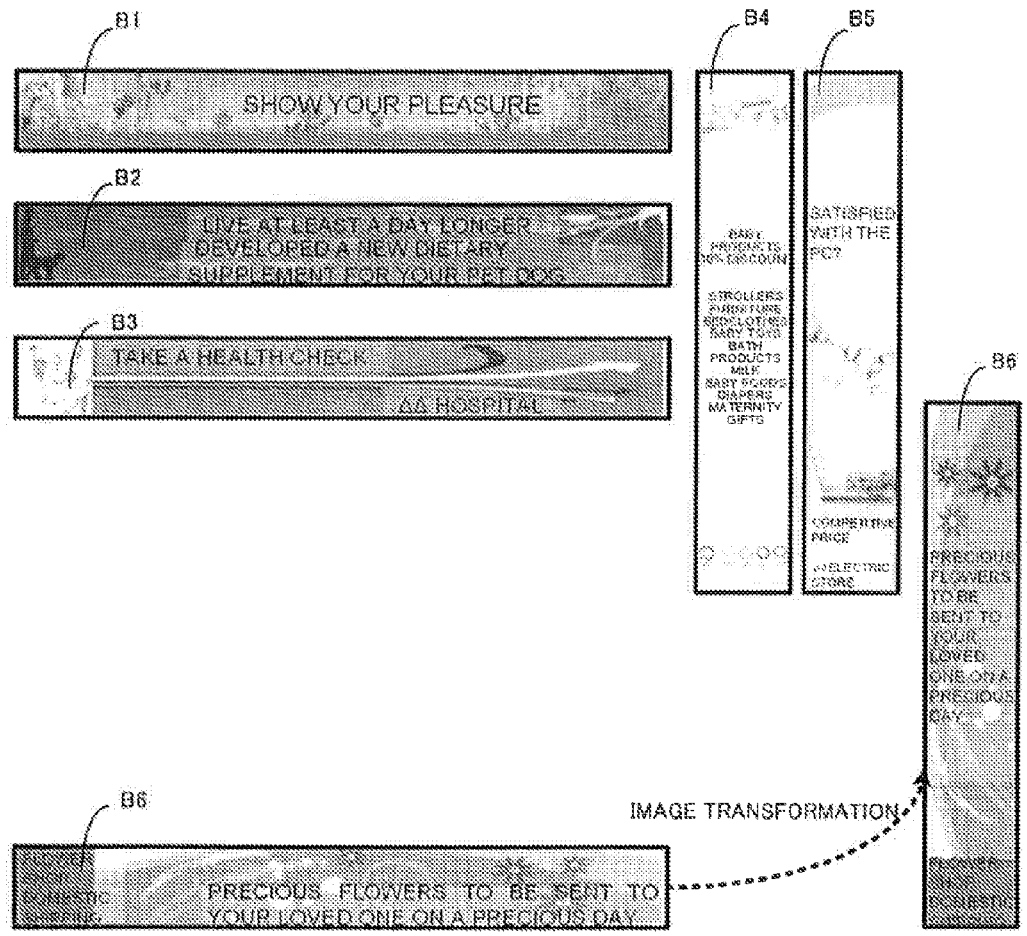
FIG. 3 is a front view illustrating a plurality of exemplary ad content overlays which can be overlaid on the video frame depicted in FIG. 2.

FIG. 3 is a front view illustrating a plurality of exemplary ad overlays B1-B6 which can be overlaid on the video frame depicted in FIG. 2.

Each ad overlay may be an ad overlay using widget (i.e., an exemplary displayable application). Such an ad overlay may be composed to include at least one of a text, a picture (still or moving) and an application (e.g., widget), and may be composed to further include an associated audio. One example of such an application may be composed in a language such as the HTML (HyperText Markup Language) or the BML (Broadcast Markup Language). Typically, such an ad overlay is composed with an attractive logo and a text, because of the nature of advertising, such as illustrated in FIG. 3.

In an example illustrated in FIG. 3, each of the ad overlays B1, B2, B3 and B6, because of its original shape (e.g., vertical or horizontal) and size, without requiring image transformation, can be inserted into the candidate overlay insertion region A1 or A4 depicted in FIG. 2. Each of the ad overlays B4 and B5, because of its original shape and size, without requiring image transformation, can be inserted into the candidate overlay insertion region A2 or A3 depicted in FIG. 2.

In the example illustrated in FIG. 3, each ad overlay B1-B6 can be automatically modified, by application of image transformation, so as to fit the shape and size of any one of the candidate overlay insertion regions A1-A4. For example, while the ad overlay B6 has its original shape and size that fit the candidate overlay insertion region A1 or A4, the ad overlay B6 can undergo the image transformation in order to change its shape and size so as to fit the candidate overlay insertion region A2 or A3.

An ad overlay, when in a text, can undergo the "Ticker Application" to generate a display image by modifying or editing the original shape and size of the ad overlay, so that the display image can fit a selected one of the candidate overlay insertion regions A1-A4. The use of the "Ticker Application" allows an ad overlay to be neatly inserted into any one of the candidate overlay insertion regions A1-A4.

Figure 4A:
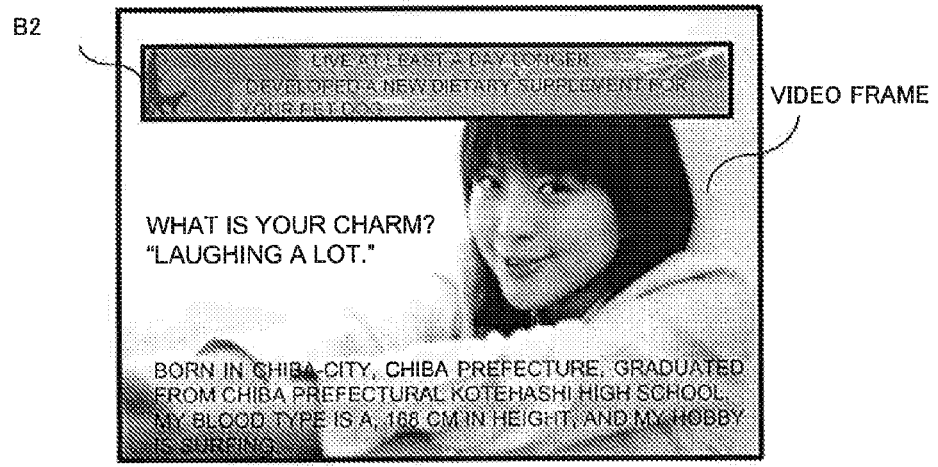
FIGS. 4A-4C are front views illustrating exemplary video frames displayed on screen with the ad content overlays, all of which frames are highly likely to cause a viewer to feel visual discomfort from the video frames.
Figure 4B:
Figure 4C:

FIGS. 4A-4C are front views illustrating exemplary video frames displayed on the display screen 7 along with the ad overlays B2, B4 and B1, all of which frames are highly likely to cause a viewer to feel visual discomfort from the video frames.

FIG. 4A illustrates a scenario in which the ad overlay B2 is superimposed onto a video frame having a high or major ratio (e.g., >0.5) of the area of a feature picture (e.g., a principal object or character) of the video frame, to the area of the entire video frame. In this scenario, a viewer is highly likely to feel visual discomfort from the video frame when viewing, because the ad overlay B2 occludes the feature picture of the video frame and disrupts the viewer's satisfactory viewing of the feature picture.

FIG. 4B illustrates another scenario in which the ad overlay B4 is superimposed onto a video frame at a position relatively close to a feature picture of the video frame. In this scenario, despite that a viewer's eyes focus on the feature picture, the ad overlay B4 is displayed close to the feature picture. This causes the ad overlay B4 to occlude the feature picture, and therefore, the viewer is highly likely to feel visual discomfort from the video frame when viewing. In this scenario, the video frame has a larger open space remote from the ad overlay B4. The ad overlay B4, if located in the remote space, will not disrupt the viewer's viewing of the feature picture.

FIG. 4C illustrates still another scenario in which the ad overlay B1 is superimposed onto a video frame, with the ad overlay B1 ad the video frame being similar in color tone. In this scenario, it is not easy for a viewer to visually distinguish between the video frame and the ad overlay B1, resulting in the higher likelihood of the viewer feeling visual discomfort.

In the present embodiment, an on-screen location at which an ad overlay is displayed on a video content (i.e., an original video content), and image characteristics (e.g., the number of different colors, saturation, luminance, texture, etc.) with which the ad overlay is displayed along with the video content, are optimized to fit the composition of the video content, in order to prevent the ad overlay, when displayed along with the video content, from causing the viewer to feel visual discomfort. More specifically, in the present embodiment, a selection is made of an optimal kind of an ad overlay and an optimal position at which the ad overlay is superimposed on a video frame, in order to prevent the viewer from feeling visual discomfort from display images such as illustrated in FIG. 4 by way of example.

Figure 5:
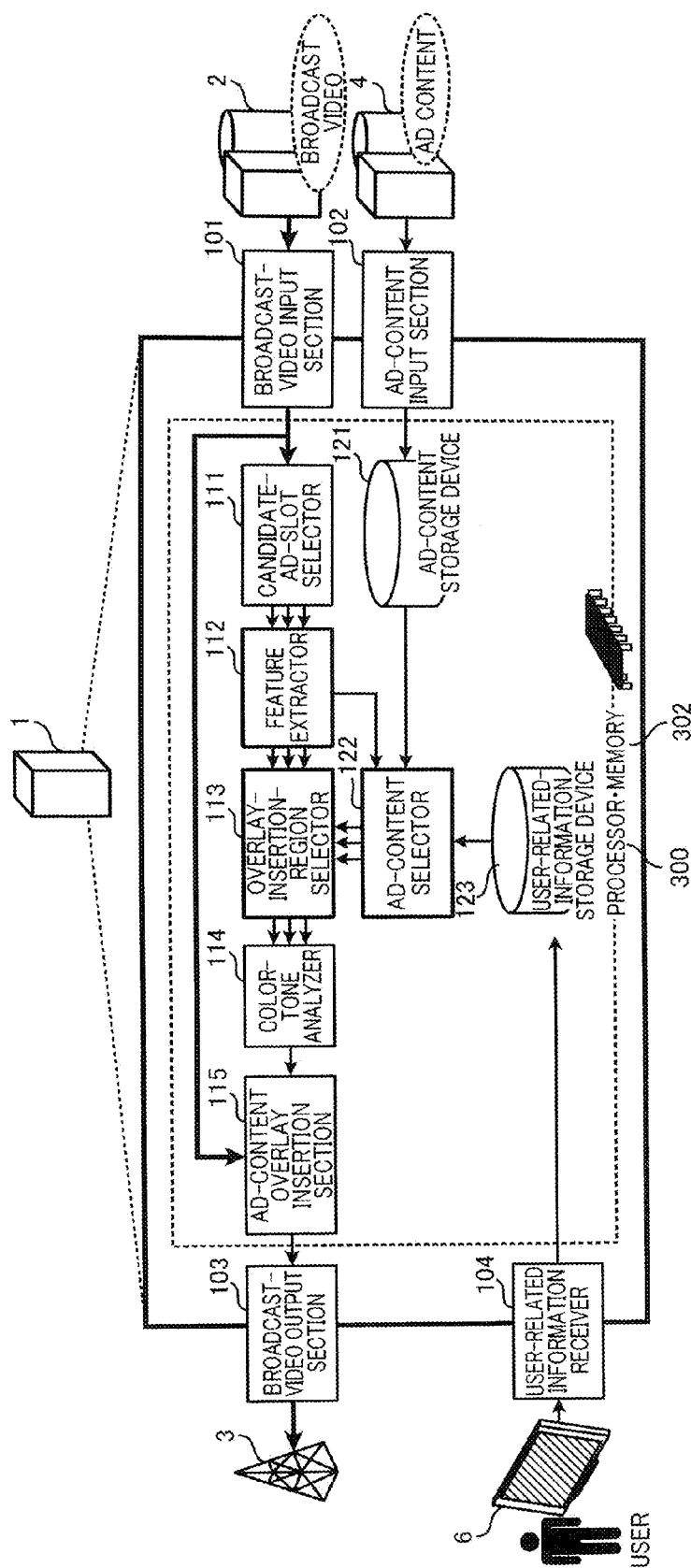
FIG. 5 is a functional block diagram conceptually illustrating the video providing unit depicted in FIG. 1.

FIG. 5 is a functional block diagram conceptually illustrating the video providing unit 1.

As illustrated in FIG. 5, the video providing unit 1 is configured to include: a broadcast-video input section 101; an ad-content input section 102; a broadcast-video output section 103; and a user-related information receiver 104. The broadcast-video input section 101 receives a broadcast video from the broadcast center 2, while the ad-content input section 102 receives an ad content from the ad distribution server 4.

In an alternative, the broadcast-video input section 101 receives a broadcast video over the Internet, while the ad-content input section 102 receives an ad content over the Internet. The broadcast-video output section 103 outputs a broadcast video combined with an ad overlay, to the broadcasting antenna 3, which serves as a content streamer.

In an alternative, the broadcast-video output section 103 distributes a broadcast video directly to the terminals 6 of the users over the Internet. The user-related information receiver 104 receives sets of user-related information (e.g., user profiles) from the terminals 6 of the users, respectively.

As illustrated in FIG. 5, the video providing unit 1 is configured to include: a candidate-ad-slot selector 111; a feature extractor 112; an ad-content storage device 121; an ad-content selector 122; an overlay-insertion-region selector 113; a color-tone analyzer 114; an ad-content overlay insertion section 115; and a user-related-information storage device 123. These functional elements are implemented by operating a computer to execute a predetermined computer program. The computer, which is made of a processor 300 and a memory 303, is mounted in the video providing unit 1.

The candidate-ad-slot selector 111 inputs a broadcast video from the broadcast-video input section 101. The candidate-ad-slot selector 111 selects at least one of original slots generated by temporal segmentation of the broadcast video, as at least one candidate ad slot, such that the at least one candidate ad slot is suitable for use in overlaying an ad content over the video content, to thereby exclude or discard other slots as unqualified slots.

FIG. 6A is a functional block diagram illustrating the candidate-ad-slot selector 111, along with its peripheral elements, and FIGS. 6B-6F are views for explaining processing by the candidate-ad-slot selector 111, using an exemplary video content.

As illustrated in FIG. 6B, the exemplary video content is made up of a plurality of successive video frames, and the video frames are segmented into a plurality of successive slots. Each slot is in a temporal array of a sub-plurality of successive video frames. As illustrated in FIGS. 6D-6F, each video frame belonging to each slot is assigned three candidate overlay insertion regions A1-A3.

The candidate-ad-slot selector 111 is configured to exclude at least one of the plurality of successive slots (i.e., original slots), as at least one disqualified slot, if the at least one slot is not suitable for use in overlay of an ad content on a video content, and to measure visual and/or audio characteristic values of the remaining slots, on a per-slot basis. The candidate-ad-slot selector 111 is further configured to select at least one of the remaining slots as at least one candidate ad slot (i.e., at least one candidate of a final ad slot, or at least one qualified slot), if the at least one slot has the visual and/or audio characteristic value measured so as to be equal to or lower than a predetermined threshold, in that such a slot provides stabled successive pictures. The candidate-ad-slot selector 111 outputs the selected at least one candidate ad slot to the feature extractor 112.

More specifically, as illustrated in FIG. 6C, the candidate-ad-slot selector 111 excludes a leading or first one of the plurality of successive slots (original slots) making up the video content, as a disqualified slot (failing to be an ad slot). The reason is that many viewers tend to stop viewing a video content, as a result of the viewers' mere sight of an ad content at the beginning of the video content.

As illustrated in FIG. 6C, the candidate-ad-slot selector 111 measures a sound volume or level of each of the remaining slots (qualified slots, as of this time), and if a temporal change in the measurement of a slot exceeds a predetermined threshold, then the candidate-ad-slot selector 111 excludes the slot as a disqualified slot, so that the slot will not be used as an ad slot. The reason is that one can assumed that, if an ad overlay is inserted into a slot having a larger temporal change in sound volume, then a viewer's perception of the images of the slot will make a significant undesired change, and therefore, such a slot is not suitable as a slot into which an ad overlay is inserted. Conversely, a slot having a smaller temporal change in sound volume can be a candidate of a final ad slot.

As illustrated in FIG. 6D, the candidate-ad-slot selector 111 determines whether there is a caption (including subtitles and any other kind of text), on a video, for each of the remaining slots, per each candidate overlay insertion region, and excludes at least one candidate overlay insertion region as at least one disqualified region, for each of the remaining slots, if the at least one candidate overlay insertion region has a caption.

In other words, the candidate-ad-slot selector 111 is configured to operate such that the candidate-ad-slot selector 111, if a slot's all candidate overlay insertion regions have captions, excludes the slot, but if a slot's at least one candidate overlay insertion region does not have a caption, does not exclude the slot.

In an alternative example, the candidate-ad-slot selector 111 may be configured to operate such that the candidate-ad-slot selector 111, if a slot's at least one candidate overlay insertion region has a caption, excludes or discards the slot, but if none of a slot's candidate overlay insertion regions has a caption, does not exclude the slot. This example is useful in simplifying the system configuration and the data processing required for the selection of the candidate ad slots.

As illustrated in FIG. 6E, the candidate-ad-slot selector 111 measures a temporal change in the visual characteristic value of each candidate overlay insertion region, for each of the remaining slots (i.e., the qualified slots), and, if the measurement for a candidate overlay insertion region exceeds the predetermined threshold, then the candidate-ad-slot selector 111 excludes the candidate overlay insertion region. The candidate-ad-slot selector 111, if a slot's all candidate overlay insertion regions have the visual characteristic values exceeding the predetermined threshold, excludes the slot, but if a slot's at least one candidate overlay insertion region does not have the visual characteristic value exceeding the predetermined threshold, does not exclude the slot.

In an example, the candidate-ad-slot selector 111 may be configured to select a representative one of a sub-plurality of video frames together constituting each slot, and to measure a temporal change in the visual and/or audio characteristic value only for the representative video frames, in the entire region or the feature region, for each slot.

As illustrated in FIG. 6F, the candidate-ad-slot selector 111 eventually outputs the candidate ad slots to the feature extractor 112, along with the availability of each of the candidate overlay insertion regions lying on one video frame. More specifically, the candidate-ad-slot selector 111 eventually outputs ones of the successive slots (i.e., the original slots) each of which has at least one candidate overlay insertion region suitable for use in the overlay of an ad content over a video content, as candidate ad slots, to the feature extractor 112.

FIG. 7A is a functional block diagram illustrating the feature extractor 112 and the overlay-insertion-region selector 113, along with their peripheral elements, FIG. 7B is a flowchart conceptually illustrating processing by the feature extractor 112, and FIG. 7C is a flowchart conceptually illustrating processing by the overlay-insertion-region selector 113.

First, the feature extractor 112 will be outlined.

The feature extractor 112 receives the video content from the candidate-ad-slot selector 111, only for the candidate ad slots, on a per-slot basis, and performs feature extraction for video frames on a per-slot basis. In a preferable example, the feature extractor 112 is configured to compact an original version of each video frame received, prior to the extraction, for shortening the required time for the upcoming extraction, and to extract one or more features of each compacted video frame. For the compaction process, in an example, the resolution or the count of the layers is reduced. The extraction for compacted video frames could reduce the computational load for the subsequent data processing.

Referring next to FIG. 7B, the feature extractor 112 will be described in more detail.

(S701) The feature extractor 112 first selects a plurality of provisional representative frames of the sub-plurality of video frames together constituting a current one of a plurality of candidate ad slots. The feature extractor 112 may select ones of the sub-plurality of video frames which are arrayed at the fixed time intervals, or may select them according to any other predetermined rule, as the plurality of provisional representative frames.

(S702) The feature extractor 112 next extracts one or more visual features of the provisional representative frames, on a per-frame basis. Each visual feature of a video frame is defined as a portion of the video frame that is more important than any other portions, because the portion easily catches a viewer's eyes, and constitutes the viewer's visual perception.

The feature extractor 112 extracts one or more features from each provisional representative frame, using at least one of the following feature extraction or recognition techniques:

[1] Facial Recognition

By the facial recognition, the coordinate values of a rectangular feature domain of each video frame (e.g., coordinate values of an upper left corner and a lower right corner of the domain) are calculated.

[2] Caption Extraction

By the caption extraction, the coordinate values of a rectangular feature domain of each video frame (e.g., coordinate values of an upper left corner and a lower right corner of the domain) are calculated. One example of the caption extraction may be a conventional one in which temporal changes in luminance and luminance gradients are used (see Patent Document Nos. 3 and 4, for example).

[3] Motion Recognition Using a Motion Attention Model, or Extraction of a Region of Interest (ROI)

By the motion recognition or the extraction of ROI, the coordinate values of a rectangular feature domain of each video frame (e.g., coordinate values of an upper left corner and a lower right corner of the domain) are calculated (see Non-Patent Document No. 3, for example).

[4] Extraction of Interest Points

A method of extraction of interest points is performed on the premise that, on an image, as the number of the interest points within a unit size area increases, i.e., as the density of the interest points increases, the visual information within the unit size area becomes more significant. This method is a technique of extracting corner points of an image or picture, such as a corner extraction method, one example of which is the Harris-Stephens method.

By this method, a domain having the density exceeding a predetermined level is extracted as a feature domain.

By this method, the coordinate values of a rectangular feature domain of each video frame (e.g., coordinate values of an upper left corner and a lower right corner of the domain) are calculated.

[5] Feature Extraction Based on a Total Energy Level of Alternate-Current High-Frequency Components of Discrete Cosine Transform (DCT) Coefficients For an image made up of pixels, if a sub-area of the image which is represented by a video signal having a smaller pixel-to-pixel change, then its Discrete Cosine Transform (DCT) coefficients have no or less high-frequency components. In a sub-area of the image, as its pixel-to-pixel change in video signal becomes smaller, the visual information becomes less significant.

In general, the visual perception of human eyes is more sensitive to low-frequency components of the DCT coefficients, while it is less sensitive to high-frequency components of the DCT coefficients. In this regard, the "DCT" is performed for transforming a pixel signal within a video frame, from a spatial domain into a frequency domain.

In this method, the sum of the energy levels of the high-frequency components of the DCT coefficients for pixels within a pixel block, is calculated as the total energy level for the pixel block.

[6] Feature Extraction Based on Luminance/Saturation

When a viewer is viewing an image having sub-areas, the viewer tends to be more attracted to a sub-area of the image which is higher in luminance or saturation, while the viewer tends to be less attracted to a sub-area of the image which is lower in luminance or saturation, and which has less significant information.

Based on the findings, at least one of the candidate overlay insertion regions is selected if the at least one candidate overlay insertion region exhibits at least one of a luminance ratio and a saturation ratio is lower than a predetermined threshold, as a more suitable candidate overlay insertion region into which an ad overlay is inserted. The luminance and saturation ratios are defined as follows:

Luminance Ratio: VP/VA; and

Saturation Ratio: SP/SA, where, the VA" is referred to the luminance of the entire image, the "SA" is referred to the saturation of the entire image, the "VP" referred to as the luminance of each candidate overlay insertion region, and the "SP" referred to as the saturation of each candidate overlay insertion region.

Meanwhile, as described above, when the total area of one or more features of a video frame is smaller, an ad overlay can be inserted into a partial sub-area of the video frame excluding the one or more features, with greater suitability. Conversely, when the total area of one or more features of a video frame is larger, an ad overlay cannot be inserted into a partial sub-area of the video frame excluding the one or more features, with greater suitability. If an ad overlay is superimposed on a video frame having a larger total area of one or more features, then a viewer is highly likely to feel visual discomfort from the video frame.

(S703) Based on the findings, the feature extractor 112 next selects one of the plurality of provisional representative frames which has the largest total area of one or more features, as a final representative frame. The final representative frame, if overlaid with an ad content, is most likely to make the viewer to feel visual discomfort within the current candidate ad slot. The selection of such a frame that has the largest likelihood of making the viewer feel discomfort as the final representative frame allows the worst-conditioned frame within the current candidate ad slot, to be subsequently processed for the purpose. Thus, only one frame is finally selected per candidate ad slot.

(S704) Then, the feature extractor 112 calculates an area ratio of the total area of one or more features of the selected final representative frame, to the area of the selected final representative frame, and determines whether or not the area ratio is equal to or higher than a predetermined threshold.

(S705) If the area ratio is not equal to or higher than the predetermined threshold, then the feature extractor 112 outputs the final representative frame to the overlay-insertion-region selector 113. If, however, the area ratio is equal to or higher than the predetermined threshold, then the feature extractor 112 excludes or discards the current candidate ad slot. The reasons is that, should an ad overlay be inserted into a video frame having a larger total area of one or more features, the viewer is highly likely to feel visual discomfort from the vide frame (see FIG. 4A).

The overlay-insertion-region selector 113 will be next described, after the ad-content storage device 121 and the ad-content selector 123 will be described first.

The ad-content storage device 121 is configured to store a plurality of ad contents which are to be overlaid onto a video content to be broadcast. Each ad content or ad overlay may be in the form of, for example, an ad widget. In an example, the ad-content storage device 121 is configured to receive ad contents from the ad distribution server 4 via the ad-content input section 102, and store them.

In the ad-content storage device 121, the ad contents are stored in association with sets of metadata (i.e., data about data). Each set of metadata represents a set of policies by which one of the ad contents is selected. Each set of policies servers as control information which is used on the side of a provider or advertiser of each ad content. FIG. 12 exemplifies a set of policies as defined above.

In addition, the ad-content selector 122 is configured to select at least one of the plurality of ad contents stored in the ad-content storage device 121, for ad overlay insertion into a video content. In one example, the ad-content selector 122 makes a comparison between sets of metadata appended to the stored ad contents and metadata appended to the video content (e.g., a key frame or representative frame of the video content), and selects one of the ad contents if the one ad content has a category coincident with or similar with that of the video content. The ad-content selector 122 outputs the selected ad content to the overlay-insertion-region selector 113. In this example, the ad-content selector 122 performs targeted advertising.

In this example, when the video content is for broadcasting a professional baseball game, and its metadata indicates a category of "Baseball," the ad-content selector 122 selects an ad content from the ad-content storage device 121, if the ad content's metadata indicates a category of "Baseball" or a similar category.

In an alternative example, the ad-content selector 122 is configured to select at least one of the ad contents stored in the ad-content storage device 121, based on the sets of user-related information stored in the user-related information receiver 104 in association with the users to which the video content is to be delivered. The selected ad content is transmitted to the users, along with the video content which is to be overlaid with the selected ad content.

When the video content is broadcast to an unspecified large number of users (i.e., open to the general public) via the broadcasting antenna 3, it is impossible to identify each user to which the video content is about to be delivered, and the ad-content selector 122 cannot select ad contents so as to vary between different users based on the users' different sets of user-related information.

In contrast, when the video content is delivered to specific users such as in the VOD format, it is possible to identify the users to which the video content is about to be delivered, and the ad-content selector 122 can select ad contents which are tailored to the respective users, based on the users' different sets of user-related information.

The user-related information storage device 123 is configured to receive the sets of user-related information via the user-related information receiver 104, and store them. FIG. 13 exemplifies a set of user-related information.

Next, the overlay-insertion-region selector 113 will be described below.

The overlay-insertion-region selector 113 is configured to input, per each candidate ad slot, a representative one of a plurality of successive video frames constituting each candidate ad slot. The overlay-insertion-region selector 113 is further configured to select, per each candidate ad slot, one of the candidate overlay insertion regions A1-A4 pre-assigned to the representative video frame, if the one candidate overlay insertion region has the longest distance from any feature of the representative video frame, among the candidate overlay insertion regions A1-A4, as a final overlay insertion region. Each ad overlay contains or is associated with information for identifying at least one of the candidate overlay insertion regions A1-A4 (templates) of the representative video frame, which has a matching shape and a matching size.

Figure 8A:
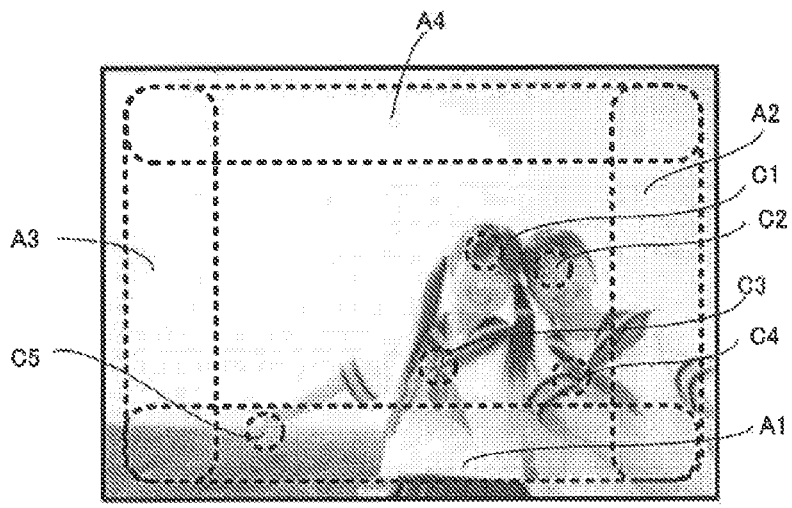
FIGS. 8A, 8B and 8C are front views for explaining in time series how the overlay-insertion-region selector depicted in FIG. 5 determines a final overlay insertion region.
Figure 8B:
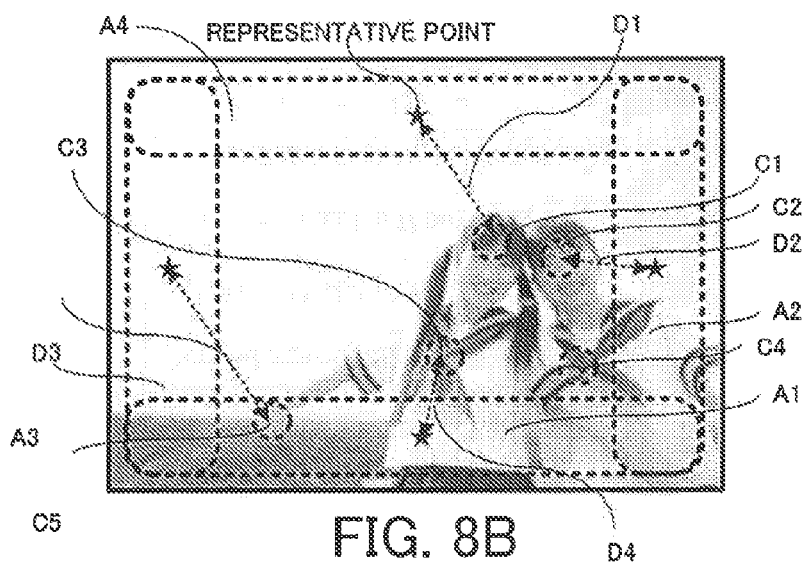
Figure 8C:
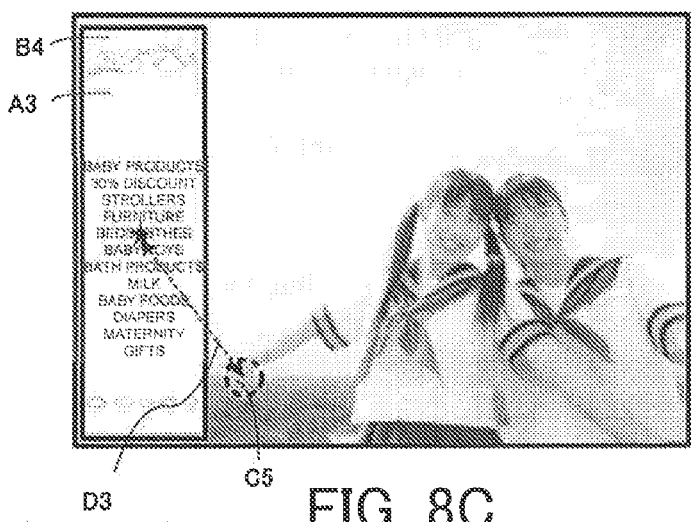

FIGS. 8A, 8B and 8C are front views for explaining in time series how the overlay-insertion-region selector 113 determines the final overlay insertion region.

Next, with reference to FIG. 7C, the overlay-insertion-region selector 113 will be described in more detail below.

(S711) The overlay-insertion-region selector 113 repeats the execution of steps S712-S714, for each of at least one remaining candidate overlay insertion regions A1-A4 of the representative frame for the current candidate ad slot. The at least one remaining candidate overlay insertion region refers to at least one of the candidate overlay insertion regions A1-A4 which has not been excluded or discarded as a result of the execution of the previous steps as described above, and which will hereinafter be referred to as "valid candidate-overlay-insertion region."

(S712) The overlay-insertion-region selector 113 repeats the execution of step S713, for each of at least one extracted feature of the current representative frame.

In an example illustrated in FIG. 8A, the candidate overlay insertion regions A1-A4 are assigned to the representative frame, and a plurality of features C1-C5 have been extracted from the representative frame. In this example, two people each serving as a principal object are displayed on the representative frame, and the features C1-C5 are extracted from the two people at their faces, chests and hands.

(S713) The overlay-insertion-region selector 113 calculates distances D between the candidate overlay insertion regions A1-A4 and the features C1-C5, to thereby determine how much uneven the position of each feature C is relative to the positions of the candidate overlay insertion regions A1-A4 within the current representative frame.

In this regard, each distance D may be calculated as a distance between the centroid (i.e., an exemplary representative point) of each candidate overlay insertion region A and the centroid (i.e., an exemplary representative point) of each feature C. Alternatively, each distance D may be calculated as a distance between a circumferential edge of each candidate overlay insertion region A (e.g., the nearest one of circumferential edges of each candidate overlay insertion region A1-A4) and the centroid of each feature C.

(S714) The overlay-insertion-region selector 113 selects, for each candidate overlay insertion region A, one of the features C1-C5 which has the shortest one of the calculated distances D among the features C1-C5, as a nearest feature.

In an example illustrated in FIG. 8A, for the candidate overlay insertion region A1, the feature C1 is selected as the nearest feature, which is spaced apart from the candidate overlay insertion region A1 by the shortest distance D1. For the candidate overlay insertion region A2, the feature C2 is selected as the nearest feature, which is spaced apart from the candidate overlay insertion region A2 by the shortest distance D2. For the candidate overlay insertion region A3, the feature C5 is selected as the nearest feature, which is spaced apart from the candidate overlay insertion region A3 by the shortest distance D3. For the candidate overlay insertion region A4, the feature C3 is selected as the nearest feature, which is spaced apart from the candidate overlay insertion region A4 by the shortest distance D4.

The longer each distance D, the farther each feature C and each candidate overlay insertion region A are spaced apart from each other on the display screen 7, the better the visual separation between each feature C and each candidate overlay insertion region A. Owing to this, the thus-selected layout or composition of each feature C and each candidate overlay insertion region A on the display screen 7 can prevent a viewer from feeling visual discomfort.

(S715) Finally, the overlay-insertion-region selector 113 selects one of the candidate overlay insertion regions A1-A4 which has the longest one of the distances D from the corresponding respective nearest features C, as the final overlay insertion region.

In an example illustrated in FIG. 8C, the distance D3 is the longest one of the distances D1-D4, and the candidate overlay insertion region A3 is selected as the final overlay insertion region into which the ad overlay B4 is to be inserted.

As a result, displaying the ad overlay B4 in superimposition with the candidate overlay insertion region A3, with the aid of a rectangular shape of the display screen 7 or a full display region for a video content, provides a possible display layout in which the ad overlay B4 is spaced farthest apart from the feature C5, or, especially when a principal object of the video content is displayed at or closet to one of the corners of the display screen 7, the ad overlay B4 is located diagonally with respect to the centroid of the feature C5. The diagonal layout is helpful in achieving better visual separation between the ad overlay B4 and the nearest feature C5.

In the example illustrated in FIG. 8, the ad-content selector 122 is configured to select only one ad content from the ad-content storage device 121, per each video frame.

In an alternative example, the ad-content selector 122 is configured to select a plurality of ad contents B1-B4 from the ad-content storage device 121, per each video frame. In this example, the overlay-insertion-region selector 113 is configured to select one of the candidate overlay insertion regions A1-A4 in decreasing order of the shortest distance D from the features C1-C5 (i.e., the distance between each candidate overlay insertion region and the nearest feature corresponding to the each candidate overlay insertion region) (e.g., D3>D1>D2>D4), in succession, such that the successively-selected one of the candidate overlay insertion regions A1-A4 serves as the final overlay insertion region for a successively-selected one of the plurality of ad contents B1-B4.

In an exemplary scenario, there is a request that a particular video content be overlaid with a number x (>1) of ad contents. The value of "x" may be pre-selected by a service provider or a content owner. In any event, the value of "x" is selected relative to the ratio of the total area of at least one principal object of the particular video content, to the area of the display screen 7, wherein the ratio depends on, for example, the total number of the at least one principal object which are displayed together on the display screen 7. The reason is that the higher the ratio, the greater the difficulty in displaying the number x of ad contents together on the display screen 7, without causing any ad content to occlude any principal object.

Then, in the present embodiment, as described above, the ad-content selector 122 selects one of the candidate overlay insertion regions A1-A4 in decreasing order of the shortest distance D from the features C1-C5, in succession, such that the successively-selected one of the candidate overlay insertion regions A1-A4 serves as the final overlay insertion region for a successively-selected one of the plurality of ad contents B1-B4 (in S715).

Figure 9A:
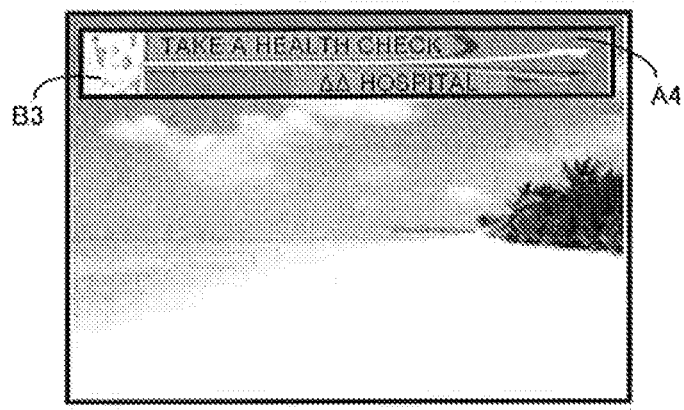
FIGS. 9A and 9B are front views for explaining in time series how the overlay-insertion-region selector depicted in FIG. 5 determines the final overlay insertion region using weighting factors varying between the candidate overlay insertion regions.
Figure 9B:
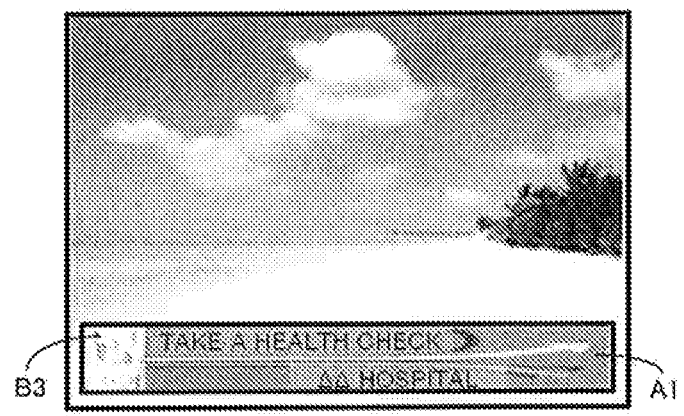

FIGS. 9A and 9B are front views for explaining in time series how the overlay-insertion-region selector 113 determines the final overlay insertion region using weighting factors varying between the candidate overlay insertion regions.

More specifically, FIG. 9A illustrates an exemplary scenario in which a video frame is displayed on the display screen 7, such that the ad overlay B3 is superimposed on an upper region of the video frame (i.e., the candidate overlay insertion region A4 in FIG. 2), while FIG. 9B illustrates another exemplary scenario in which the same video frame is displayed on the display screen 7, such that the ad overlay B3 is superimposed on a lower region of the video frame (i.e., the candidate overlay insertion region A1 in FIG. 2).

In comparison, the image of the video frame makes a viewer to visually perceive stable and balanced layout or composition of the image more strongly when the ad overlay B3 is located as illustrated in FIG. 9B, than when the ad overlay B3 is located as illustrated in FIG. 9A.

As will be evident from the above, the overlay-insertion-region selector 113 serves as a layout analyzer configured to analyze the layout of a principal object within the video frame (e.g., the relative geometry between feature points within the principal object and the candidate overlay insertion regions A1-A4), and, based on the analysis, to select the most suitable one of the candidate overlay insertion regions A1-A4 as a final overlay insertion region into which a selected ad overlay (i.e., an exemplary additional content overlay) is to be inserted.

In one example, the overlay-insertion-region selector 113 is configured to calculate, for each selected frame, the distance D of each feature C from each candidate overlay insertion region A, by multiplication of the original value of the distance D by a weighting factor ω which is pre-set to a value larger than "0" and equal to or smaller than "1." Weighting factors ω are prepared in association with the candidate overlay insertion regions A1-A4, respectively, and are tuned such that the weighting factor ω for a particular candidate overlay insertion region A is larger than those of other candidate overlay insertion regions A.

This configuration allows a pre-designated one of the candidate overlay insertion regions A1-A4 to be more likely to be selected as the final overlay insertion region than any other candidate overlay insertion region A.

One example of the pre-designated candidate overlay insertion region A is the lower portion, i.e., the candidate overlay insertion region A1, as illustrated in FIG. 9B.

It is added that, when a weighting factor ω is set to "1" for a selected candidate overlay insertion region A, the distance D for the selected candidate overlay insertion region A is equivalently calculated by using the original value of the distance D as the final value, without multiplying the original value by the corresponding weighting factor ω.

To sum up, the overlay-insertion-region selector 113 may be configured to select only one final overlay insertion region A for only one ad overlay B for each video frame, or may be configured to select a plurality of final overlay insertion regions A for a plurality of ad overlays, respectively, for each video frame. In either case, the overlay-insertion-region selector 113 outputs the selected final overlay insertion region(s) along with the corresponding ad overlay(s), to the color-tone analyzer 114.

The color-tone analyzer 114 is configured to operate such that, if the color-tone analyzer 114 has received only one ad overlay for each video frame from the overlay-insertion-region selector 113, then the color-tone analyzer 114 outputs the ad overlay as unchanged to the ad-content overlay insertion section 115.

The color-tone analyzer 114 is further configured to operate such that, if the color-tone analyzer 114 has received a plurality of ad overlays for each video frame from the overlay-insertion-region selector 113, then the color-tone analyzer 114 selects, at least one valid ad overlay, at least one of the plurality of ad overlays, such that the degree of similarity in color tone (i.e., an exemplary visual characteristic) between an image of the video content (which can be represented by its extracted feature, for example) and an image of the selected at least one valid ad overlay satisfies a predetermined condition.

In some implementations, the color-tone analyzer 114 selects one of a plurality of values of the degree of similarity calculated for the plurality of ad overlays, respectively, if the one value is higher than a predetermined similarity level (i.e., a lower allowable limit), if the one value is lower than a predetermined similarity level (i.e., an upper allowable limit), or if the one value falls within a predetermined allowable range.

In an example, the color-tone analyzer 114 may be configured to operate such that, when the color-tone analyzer 114 has received a plurality of ad overlays for each video frame, the color-tone analyzer 114 selects one of the received ad overlays in a predetermined order of priority, in succession, and outputs the successively-selected one ad overlay along with information of the corresponding final overlay insertion region, to the ad-content overlay insertion section 115.

Some underlying concepts exist that are available in selecting a visually suitable one of a plurality of ad overlays.

A first exemplary one of such underlying concepts is that, if there is great similarity in color tone between a current video frame and a current ad overlay (i.e., the degree of the similarity mentioned above is high), the current ad overlay should not be displayed in the current video frame because a viewer is highly likely to be incapable of visually identifying an outline of the current ad overlay in the video frame with ease.

A second exemplary one of such underlying concepts is that, if there is great similarity in color tone between a current video frame and a current ad overlay (i.e., the degree of the similarity mentioned above is high), the current ad overlay should be displayed in the current video frame because a viewer is highly likely not to feel visual discomfort when viewing the current ad overlay along with the current video frame.

While the first and second exemplary underlying concepts are exclusive to each other, one of them can be selected depending on a viewer's trait, preferences, etc.

In any event, it is preferable to select one of ad overlays which bears color tone having a good match with the color tone of the current video frame.

In one example, the color-tone analyzer 114 is configured to attempt to extract an edge of a current ad overlay in a current video frame, using, for example, the Canny filter, by comparison between luminance or saturation of each pixel and a predetermined threshold, and, if the attempt is unsuccessful, then the color-tone analyzer 114 discards the current ad overlay because the degree of the similarity exceeds the upper allowable limit. This results in successful selection of an ad overlay bearing color tone allowing a viewer to visually perceive the ad overlay with a maximum of ease.

The ad-content overlay insertion section 115 is configured to insert the selected ad overlay into the video content, so that the video content can be displayed such that the add overlay is superimposed on the selected final overlay insertion region which is one of the candidate overlay insertion regions A1-A4 assigned to each video frame, to thereby modify the video content. The modified video content is transmitted to the broadcast-video output section 103.

The broadcast-video output section 103 is configured to output the received video content to the terminals 6 in the users' homes, via the broadcasting antenna 3 or the Internet. The received video content at each terminal 6 is displayed on the display screen 7 of each terminal 6. Each user can view the video content and the selected ad overlay together on the display screen 7 of the user's terminal 6.

Next, a second illustrative embodiment of the present invention will be described, except for many duplicate elements of the present embodiment to those of the first embodiment, which elements will be referenced the same reference numerals or names as those of the first embodiment. Only different elements of the present embodiment from those of the first embodiment will be described in more detail.

Figure 10:
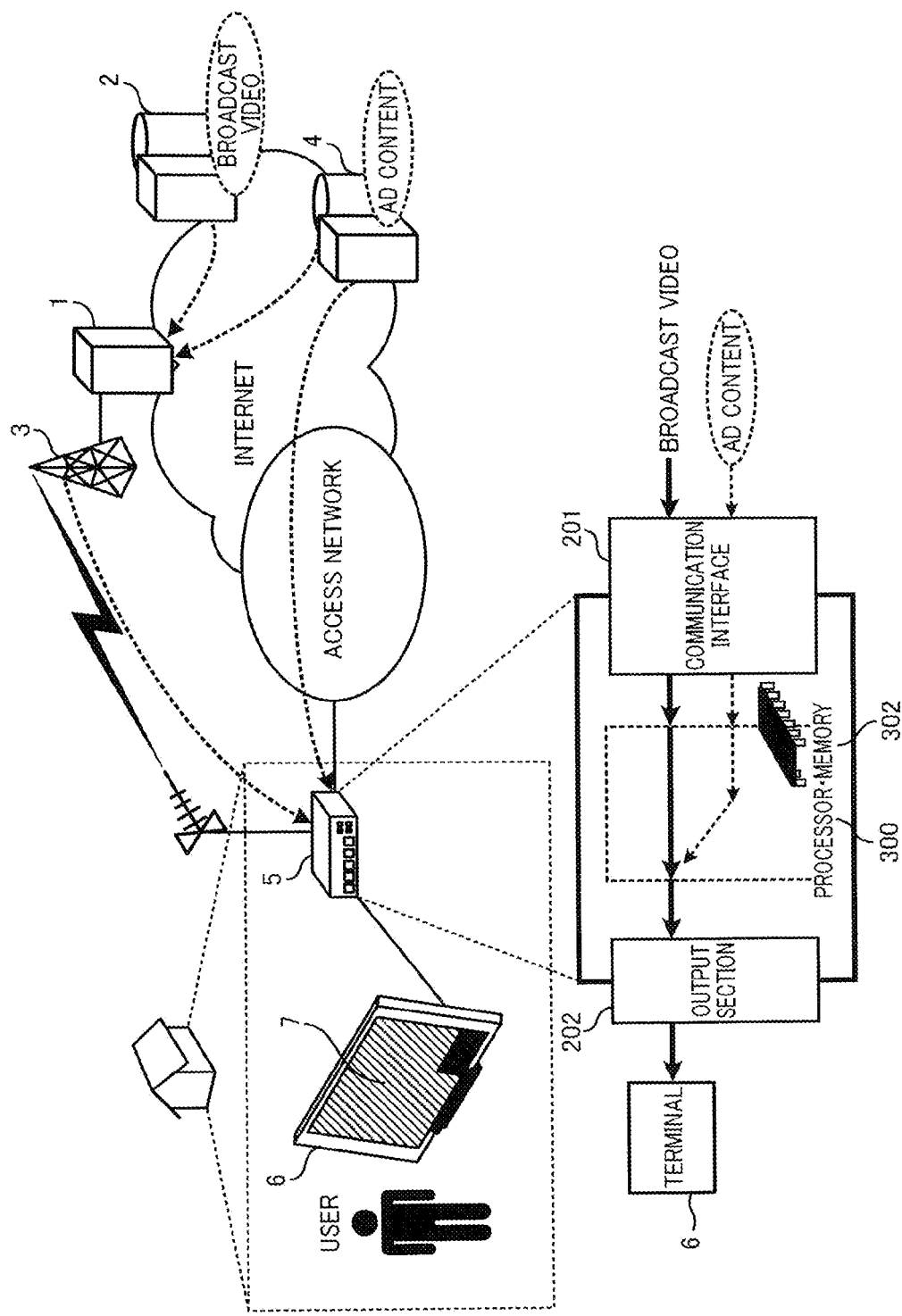
FIG. 10 is a schematic diagram illustrating a broadcasting system constructed according to a second illustrative embodiment of the present invention, wherein a set-top box linked to a viewer's terminal overlays an ad content onto a video content.

FIG. 10 is a schematic diagram illustrating a broadcasting system constructed according to the present embodiment, wherein the set-top box 5 linked to a viewer's terminal 6 overlays an ad content onto a video content.

As illustrated in FIG. 10, the set-top box 5 receives a broadcast video at a communication interface 201 from the broadcast center 201 via the broadcasting antenna 3 or the Internet.

The set-top box 5 also receives an ad content from the ad distribution server 4 via the access network and the Internet, based on a user-related information corresponding to the user of the terminal 6.

More specifically, the set-top box 5 operates in the same manner as the video providing unit 1 in the first embodiment, to thereby insert an ad overlay into a video content. The set-top box 5 outputs the video content together with the inserted ad overlay at an output section 202 to the terminal 6. Because of this arrangement, the set-top box 5 allows the user to view the ad overlay in superimposition on the video content on the display screen 7, with the ad overlay on having its context fitting the user's profile, on a user-by-user basis, with the ad overlay being located at a position that fits the display position of a principal object of the video content, and with the ad overlay being displayed with its color tone that fits the color tone of the video content.

Figure 11:
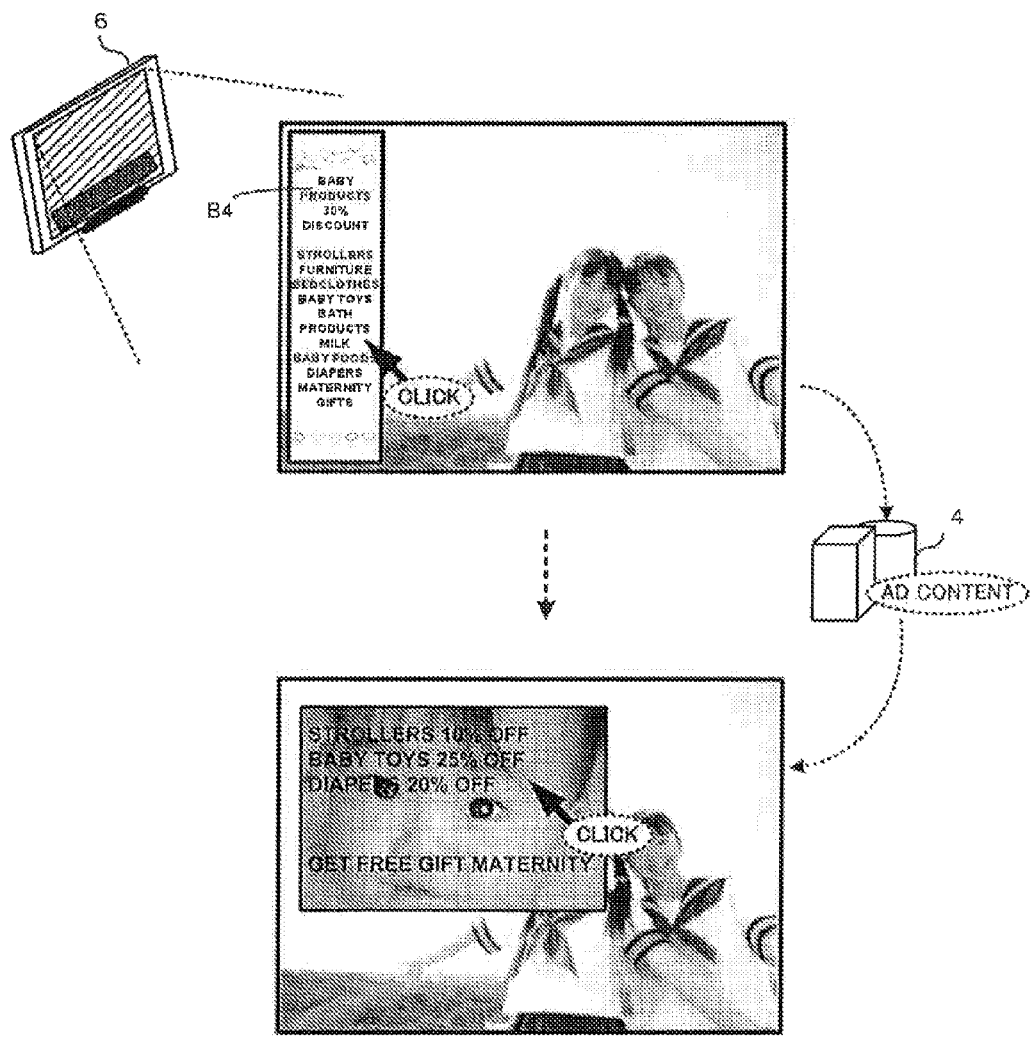
FIG. 11 is a view for explaining the function of the set-top box depicted in FIG. 10, of delivering to a viewer an ad content depending on the viewer's action on a selected one of objects on a display screen.

FIG. 11 is a view for explaining the function of the set-top box 5 depicted in FIG. 10, of delivering to a viewer an ad content depending on the viewer's action on a selected one of objects on a display screen.

The terminal 6 enables the user to receive the user's action. In an exemplary implementation in which an abbreviated version of an ad content has previously been displayed in superimposition on a selected overlay insertion region on the display screen 7 with the aid of the ticker application, if the user points to the overlay insertion region, with a pointing device (although not shown, its example is a mouse to be clicked by the user on the overlay insertion region), for requesting a detailed version of the ad overlay, then the set-top box 5 requests the ad distribution server 4 to deliver the detailed version of the ad content to the set-top box 5.

Thereafter, the set-top box 5 receives the detailed version of the ad content from the ad distribution server 4, and outputs the received ad content to the terminal 6. It is preferable to display the detailed version of the ad content on the display screen 7 in a larger area, irrespective of the layout and the temporal image-characteristic-changes of each video frame of the video content. The user, if the detailed version of the ad content is displayed in that manner, can view the detailed version of the ad content on the display screen 7, with the detailed version of the ad content appearing over the full area of the display screen 7.

As will be evident from the foregoing, according to the present embodiment, when a viewer views a video content together with an ad overlay, the ad overlay is displayed on the video content at a proper position that is most likely to prevent the viewer from feeling visual discomfort, with the ad overlay having its context having a good match with the context of the video content or having a good match with the viewer's profile.

More specifically, the present embodiment performs automatic adaptive selection of the on-screen position and the color tone of the ad overlay displayed to the viewer, so as to prevent the ad overlay from disrupting or adversely affecting the viewer's proper viewing of a principal portion of the video content (e.g., a principal object or a feature element), depending on the layout and the image characteristics of the video content.

Further, the present embodiment performs automatic selection of a presentation timing at which an ad overlay is presented to the viewer during the viewing of the video content, so as to reduce the likelihood that the viewer skips the ad overlay or stops viewing the video content, resulting in an increase in the expected exposure time that the viewer is exposed to one or more ad contents within a series of video content or program.

The present embodiment can be implemented for presentation to the viewer of an additional content overlay not only in the form of a commercial ad to promote an article or service which is relevant to the context of a program having a video content that a viewer is viewing, but also in the form of a public notice delivered from the broadcast center 2 (e.g., election returns prompt report) which is irrelevant to the program.

When the additional content overlay is in the form of an irrelevant content to the context of the program, the present embodiment would allow the irrelevant content to be displayed at a position which is selected to prevent the irrelevant content from disrupting the viewer's proper viewing of the program, without causing the viewer from feeling visual discomfort. This allows an additional content to be presented to the viewer with the maximum reduced likelihood that the additional content diminishes the original value of the program.

In an alternative exemplary implementation, the present embodiment may allow an additional content overlay to be displayed over a video content at a position which is selected to intentionally make the viewer to feel "greater" visual discomfort than any other position.

In one example in which the additional content is an emergency additional content (e.g., earthquake early warning, emergency alert messages), it is important to focus the viewer's attention onto such an emergency content, even if this has to disrupt the viewer's proper viewing of the video content which is overlaid with such an emergency additional content.

Displaying an additional content overlay over a video content at a position which makes the viewer to feel "greater" visual discomfort than any other position allows the emergency additional content to be displayed at a position that helps the viewer not to miss the appearance of the emergency additional content.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for providing a video content formed of a plurality of successive video frames, comprising:
   a feature extractor configured to extract a visual feature from an image of each of subject frames which are all or some of the plurality of video frames; and
   an overlay insertion region selector configured to select one of a plurality of candidate overlay insertion regions which are pre-assigned on each of the subject frames at different positions for allowing an additional content as a content overlay to be overlaid on each subject frame for display, as a final overlay insertion region, such that, on each subject frame, the final overlay insertion region has a distance from the extracted feature that is substantially the longest among distances of the plurality of candidate overlay insertion regions from the extracted feature.

2. The apparatus according to claim 1, wherein the overlay insertion region selector is configured to calculate, for each subject frame, a distance of the extracted feature from each candidate overlay insertion region, weighted using a weighting factor ω which is equal to or larger than "0" and equal to or smaller than "1," to thereby allow a pre-designated one of the plurality of candidate overlay insertion regions to be more likely to be selected as the final overlay insertion region than any other candidate overlay insertion region.

3. The apparatus according to claim 1, wherein the distance is defined as a distance between a centroid of each candidate overlay insertion region and a centroid of the extracted feature, or a distance between a circumferential edge of each candidate overlay insertion region and the centroid of the extracted feature.

4. The apparatus according to claim 1, wherein the feature includes a plurality of features of each subject frame,
the overlay insertion region selector is configured to calculate, for each candidate overlay insertion region, a plurality of distances of the plurality of features from the each candidate overlay insertion region, respectively,
to select, for each candidate overlay insertion region, one of the plurality of features which has the shortest one of the plurality of distances calculated, as a nearest feature, and
to select one of the plurality of candidate overlay insertion regions which has the longest one of a plurality of distances from the nearest feature, as the final overlay insertion region.

5. The apparatus according to claim 1, wherein the additional content includes a plurality of additional contents to be overlaid on the video content, and
the overlay insertion region selector configured to select one of the plurality of candidate overlay insertion regions in decreasing order of the distance from the extracted feature, in succession, such that a successively-selected one of the plurality candidate overlay insertion regions serves as the final overlay insertion region for a successively-selected one of the plurality of additional contents.

6. The apparatus according to claim 1, wherein the additional content includes a plurality of additional contents to be overlaid on the video content,
the apparatus further comprises an additional content selector configured to select, at least one valid additional content, at least one of the plurality of additional contents, such that a degree of similarity in visual characteristic between an image of the video content and an image of the selected at least one valid additional content satisfies a predetermined condition, and
the overlay insertion region selector is configured to select one of the plurality of candidate overlay insertion regions as the final overlay insertion region for the selected at least one valid additional content.

7. The apparatus according to claim 6, wherein the visual characteristic is defined as color tone of an image.

8. The apparatus according to claim 6, wherein the predetermined condition is defined so as to be satisfied if the degree of similarity is higher than a predetermined similarity level, is defined so as to be satisfied if the degree of similarity is lower than a predetermined similarity level, or is defined so as to be satisfied if the degree of similarity falls within a predetermined range.

9. The apparatus according to claim 1, wherein the plurality of video frames are segmented into a plurality of successive slots each in a temporal array of a sub-plurality of successive video frames,
the apparatus further comprises a candidate overlay insertion slot selector configured to select at least one of the plurality of successive slots as at least one candidate overlay insertion slot each of which is a candidate of a slot into which the additional content is finally inserted, and
the candidate overlay insertion slot selector is configured to exclude at least one of the plurality of successive slots, if the at least one slot is not suitable for use in overlay of the additional content on the video content,
to measure a visual and/or audio characteristic value of each slot,
to select at least one of the remaining slots as the at least one candidate overlay insertion slot, if the at least one slot has the visual and/or audio characteristic value measured so as to be equal to or lower than a predetermined threshold, and
to output the selected at least one candidate overlay insertion slot to the feature extractor.

10. The apparatus according to claim 9, wherein the feature extractor is configured to select, for each candidate overlay insertion slot, a plurality of provisional representative frames from the sub-plurality of successive video frames forming each candidate overlay insertion slot,
to extract a feature from an image of each provisional representative frame,
to select, for each candidate overlay insertion slot, one of the plurality of provisional representative frames which has a total area of the extracted feature that is the largest among total areas of features of the plurality of provisional representative frames, as a final representative frame, wherein, for each provisional representative frame, if the extracted feature includes only one feature, the total area is equal to an area of the only one feature, while if the extracted feature includes a plurality of features, the total area is equal to a sum of areas of the plurality of features, and
to exclude at least one of the plurality of candidate overlay insertion slots, which corresponds to the final representative frame that has a ratio of the total area of the extracted feature, to an area for display of the final representative frame.

11. The apparatus according to claim 1, wherein the feature extractor is configured to extract the feature from each subject frame, by at least one of the followings:
facial recognition,
slot into which extraction,
motion recognition using a motion attention model,
extraction of Region of Interest (ROI),
extraction of interest points,
feature extraction based on a total energy level of alternate-current high-frequency components of Discrete Cosine Transform (DCT) coefficients, and
feature extraction based on luminance/saturation.

12. The apparatus according to claim 1, wherein the video content includes digital broadcast video data to be delivered from a broadcast center to a plurality of potential or actual viewers,
the additional content includes an advertising content as an advertisement overlay to be delivered from an advertisement distribution server to the plurality of viewers, and
the apparatus further comprises an advertising content storage device, locally disposed for each viewer, and configured to store therein the advertising content received from the advertisement distribution server.

13. The apparatus according to claim 12, wherein the advertising content storage device stores therein a plurality of advertising contents, in association with a plurality of sets of information corresponding to the plurality of viewers, and the apparatus further comprises an advertising content selector, locally disposed for each viewer, and configured to select at least one of the plurality of advertising contents stored in the advertising content storage device, based on the information corresponding to each viewer who has received the video content.

14. The apparatus according to claim 1, further comprising:

an additional content overlay insertion section configured to insert the additional content into the video content, so that the video content is displayed such that the additional content is overlaid on the selected final overlay insertion region, to thereby modify the video content, and a video content output section configured to output the modified video content.

15. A method of providing a video content formed of a plurality of successive video frames, comprising:

extracting, by a computer, a visual feature from an image of each of subject frames which are all or some of the plurality of video frames; and selecting, by the computer, one of a plurality of candidate overlay insertion regions which are pre-assigned on each of the subject frames at different positions for allowing an additional content as a content overlay to be overlaid on each subject frame for display, as a final overlay insertion region, such that, on each subject frame, the final overlay insertion region has a distance from the extracted feature that is substantially the longest among distances of the plurality of candidate overlay insertion regions from the extracted feature.

16. The method according to claim 15, further comprising:

inserting, by the computer, the additional content into the video content, so that the video content is displayed such that the additional content is overlaid on the selected final overlay insertion region, to thereby modify the video content, and outputting the modified video content.

17. A method of providing a video content formed of a plurality of successive video frames, comprising:

extracting, by a computer, a visual feature from an image of each of subject frames which are all or some of the plurality of video frames; and selecting, by the computer, one of a plurality of candidate overlay insertion regions which are pre-assigned on each of the subject frames at different positions for allowing an additional content as a content overlay to be overlaid on the subject frames for display, as a final overlay insertion region, based on distances of the plurality of candidate overlay insertion regions from the extracted feature.

* * * * *